(12) United States Patent
Michalczuk et al.

(10) Patent No.: US 11,973,446 B2
(45) Date of Patent: Apr. 30, 2024

(54) LONG STATOR LINEAR ELECTRIC MOTOR

(71) Applicant: HYPER POLAND ELECTRO S.A., Warsaw (PL)

(72) Inventors: Marek Michalczuk, Pruszków (PL); Marcin Nikoniuk, Warsaw (PL); Pawel Radziszewski, Warsaw (PL)

(73) Assignee: HYPER POLAND ELECTRO S.A., Warsaw (PL)

( * ) Notice: Subject to any disclaimer, the term of this patent is extended or adjusted under 35 U.S.C. 154(b) by 0 days.

(21) Appl. No.: 18/281,421

(22) PCT Filed: Mar. 4, 2022

(86) PCT No.: PCT/EP2022/055645
§ 371 (c)(1),
(2) Date: Sep. 11, 2023

(87) PCT Pub. No.: WO2022/189310
PCT Pub. Date: Sep. 15, 2022

(65) Prior Publication Data
US 2024/0097591 A1    Mar. 21, 2024

(30) Foreign Application Priority Data
Mar. 12, 2021    (EP) ..................................... 21162459

(51) Int. Cl.
*H02P 25/064*    (2016.01)
(52) U.S. Cl.
CPC .................................. *H02P 25/064* (2016.02)
(58) Field of Classification Search
CPC .................................................... H02P 25/064
See application file for complete search history.

(56) References Cited

U.S. PATENT DOCUMENTS 10,454,355 B2  10/2019  Weber
10,727,774 B2   7/2020  Santamaria
(Continued)

FOREIGN PATENT DOCUMENTS

| CN | 107395091 | 11/2017 |
|----|-----------|---------|
| EP | 3528382   | 8/2019  |
| EP | 3627677   | 3/2020  |

OTHER PUBLICATIONS

International Search Report and Written Opinion as issued by the International Searching Authority, dated May 9, 2022, for International Patent Application No. PCT/EP2022/055645; 14 pages.

*Primary Examiner* — Zoheb S Imtiaz
(74) *Attorney, Agent, or Firm* — Faegre Drinker Biddle & Reath LLP (57) ABSTRACT

Linear electric motor comprising a stator comprising a plurality of stator segments and a drive system comprising at least one pair of drive units, a first drive unit of said pair connected to a first stator segment and a second drive unit of said pair connected to a second stator segment adjacent the first stator segment, the drive units connected to a DC voltage source, each drive unit comprising a DC input circuit section and a multi-level inverter connected to the DC voltage source via the DC input section, the multi-level inverter comprising a multiphase output connected to coils of the corresponding stator segment. The DC circuit section of the drive units comprises at least two link capacitors (C1, C2) connected between a positive and a negative voltage supply line (V+, V−) and having a mid-point therebetween.

11 Claims, 9 Drawing Sheets

(56) References Cited

U.S. PATENT DOCUMENTS

2014/0375232 A1* 12/2014 Findeisen ............... H02P 25/22
                                                                               318/139
2016/0311656 A1* 10/2016 Rodriguez ................ B66B 1/30

* cited by examiner

LONG STATOR LINEAR ELECTRIC MOTOR

CROSS-REFERENCE TO RELATED APPLICATIONS

The present application is a national stage entry of International (PCT) Patent Application Number PCT/EP2022/055645, filed Mar. 4, 2022, which claims priority to European Patent Application Number 21162459.8, filed Mar. 12, 2021, the complete disclosures of which are expressly incorporated herein by reference.

The present invention relates to a linear electric motor having a long stator and short mobile counterpart, in particular for driving trains, trams and other vehicles along tracks, including magnetic levitation tracks.

A long stator linear motor has a higher impedance than a shorter stator and leads to various technical problems in the design of the drive system. High impedance stators require high voltage power electronic converters to supply high reactive power, have low efficiency, and increased manufacturing cost. The drive system of a much shorter mobile motor element than the length of the stator has a very low efficiency, because only the part of the stator which is covered by the mobile motor element is active in the generation of the thrust.

In order to increase the performance of the drive system, for instance for driving vehicles such as trains along track, it is known to separate the long stator of the linear motor into segments of a length comparable (e.g. 1 to 3 times) to the length of the mobile element. The length of segment depends on operational parameters such as velocity, frequency of operation, required thrust and acceleration.

Each segment is fed by a power inverter. Usually, to reduce the cost of the system, the number of inverters is lower than number of segments. The drive inverter is switched to the appropriate segment, following the motion of the vehicle. However, to avoid a gap in power delivery, during the movement of the vehicle from one section to another, at least two inverters are used to power two consecutive segments engaged by the mobile motor elements as it moves from one segment to the consecutive segment.

Multi-level power inverters in electric drive application provides many advantages compared to the more common two-level inverters. These include low higher harmonic content of the stator current, higher efficiency, lower requirements for transistor blocking voltage, better loss distribution, and lower requirements for AC output filter. Neutral-point-clamped (NPC) inverters are the most widely used topology of multi-level inverters in high-power applications. In three-level topology the input DC circuit is divided into two parts with a neutral point NP situated between two link capacitors. The best performance of the inverter is achieved with balanced voltages in the DC circuit. However, the issue of voltage balancing becomes more challenging for a converter operation with high reactive loads, as found in long stator motors. There are known various techniques to maintain the DC voltages balanced which can be divided into two categories. The first includes dedicated modulation algorithms, and the second includes additional hardware equipment. The drawback of modulation methods it that they have a limited range of effective operation, in particular they are not very effective for operation at high output voltage. The drawback of using additional hardware to balance DC voltages is the increased complexity and cost of the system.

An object of the invention is to provide a linear electrical motor for applications requiring a long stator and short mobile counterpart, for instance for driving trains, trams and other vehicles along tracks, that is cost effective yet able to generate high power efficiently.

It is advantageous to provide a linear electrical motor that is easy to drive.

It is advantageous to provide a linear electrical motor that is simple to install and operate.

It is advantageous to provide a linear electrical motor that is robust and reliable.

Objects of the invention have been achieved by providing a stator for a linear electrical motor according to claim 1.

Disclosed herein is a linear electrical motor comprising a stator comprising a plurality of stator segments and a drive system comprising at least one pair of drive units, a first drive unit of said pair connected to a first stator segment and a second drive unit of said pair connected to a second stator segment adjacent the first stator segment. The drive units are connected to a DC voltage source, each drive unit comprising a DC input circuit section and a multi-level inverter connected to the DC voltage source via the DC input section, the multi-level inverter comprising a multiphase output connected to coils of the corresponding stator segment. The DC circuit section of the drive units comprises at least two link capacitors connected between a positive and a negative voltage supply line (V+, V−) and having a mid-point therebetween. The mid-point of the first multi-level inverter is connected via a bridge connection to the mid-point of the second multi-level inverter such that the mid-points of the first and second multilevel inverters are at a common electric potential. A drive circuit connection end of the coils of the first stator segment connected to the first multi-level inverter is arranged adjacent a drive circuit connection end of the coils of the second stator segment connected to the second multi-level inverter, or a star connection end of the coils of the first stator segment is positioned adjacent a star connection end of the coils of the second stator segment.

In an advantageous embodiment, each stator segment comprises a three-phase coil arrangement.

In an advantageous embodiment, the first drive unit is connected to plurality of successive odd numbered stator segments and the second drive unit is connected to a plurality of even numbered stator segments, the odd numbered and even numbered stator segments interleaving each other, the stator segments being connected to the corresponding drive via switches that are connected and disconnected according to the passage of the mobile motor element from one stator segment across to the next.

In an advantageous embodiment, the first and second multi-level inverters are three-level inverters.

In other embodiments, the first and second multi-level inverters may be inverters with more than three levels, for instance with five levels.

In an advantageous embodiment, the linear electric drive system comprises a plurality (n) of said pair of drive units.

In an advantageous embodiment, said plurality (n) of pairs of drive units is three or more.

In an advantageous embodiment, the drive system is configured to control at least one multi-level inverter as an external balancer to compensate voltage oscillations in the DC input sections of at least one pair of active multi-level inverters generating thrust.

In an embodiment, a length Ls of each stator segment is greater than a length Lm of a mobile motor element of the linear electrical motor.

In an alternative embodiment, a length Ls of each stator segment is less than a length Lm of a mobile motor element of the linear electrical motor. The length Lm of the mobile motor element of the linear electrical motor may in particular be greater that two times the length Ls of each stator segment.

Further objects and advantageous features of the invention will be apparent from the claims, from the detailed description, and annexed drawings, in which:

FIG. 5a show a plot showing the switching sequence of successive stator segments of the embodiment of FIG. 5;

FIGS. 6a and 5b each show a schema of a circuit of a section of a long stator, showing two consecutive stator segments connected each to a multi-level inverter drive of a pair of drives, according to embodiments of the invention, each drive with more than three-levels, e.g. a 5-level inverter drive, or a 7-level inverter drive;

Figure 1:
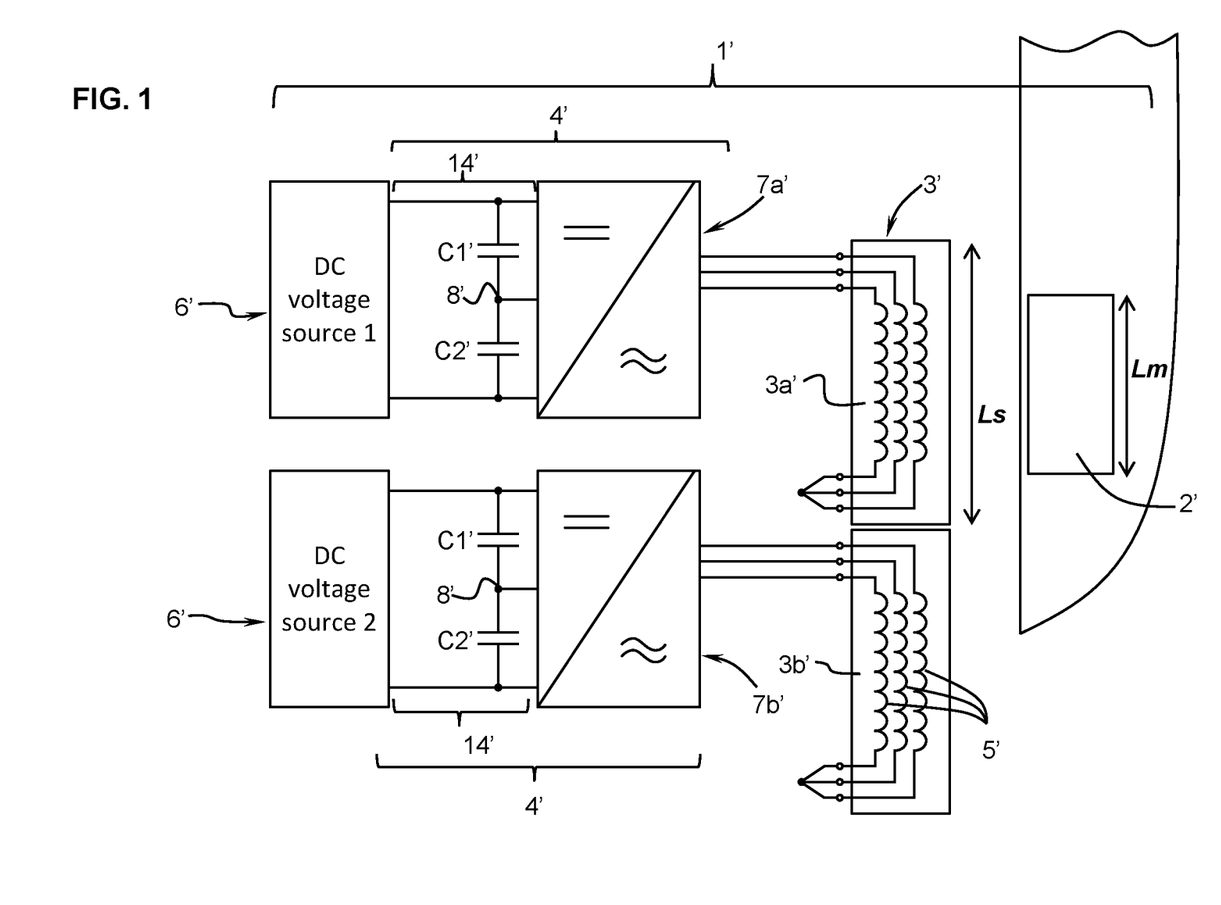
FIG. 1 is a schema of a prior art circuit of a section of a long stator, showing two consecutive stator segments and two three-level inverter drives, each stator segment connected to one of the three-level inverter drives.
Figure 2:
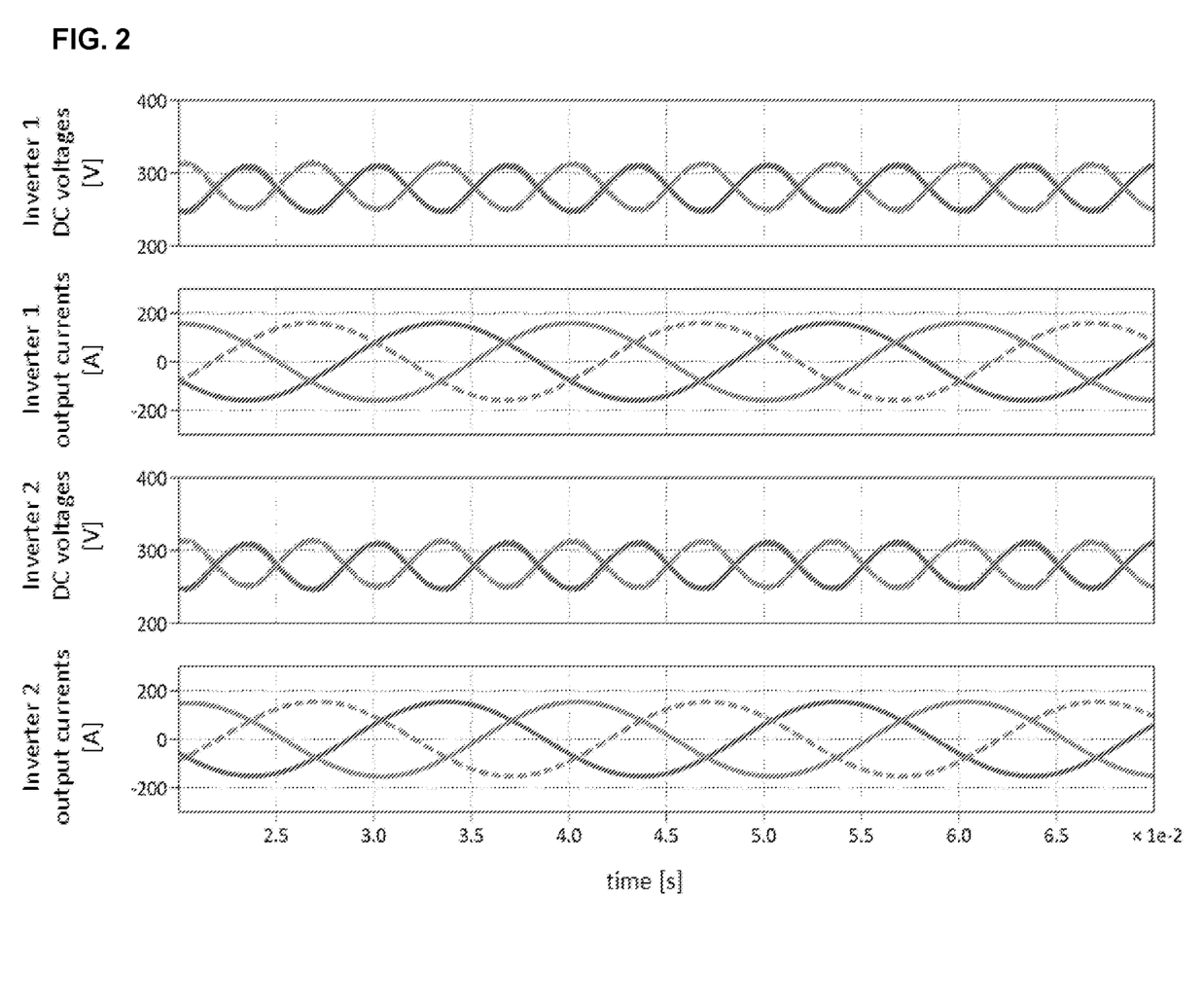
FIG. 2 show plots, over time, of output currents and fluctuations in the voltage across the link capacitors in the DC circuit portion of the two inverters of the drives of FIG. 1.

Referring to the figures, starting with FIGS. 1 and 2, a schematic circuit diagram of a conventional electrical motor 1' is illustrated. The linear electric motor 1' comprises a stator 3' having a plurality of stator segments 3a', 3b', etc. (further segments not shown) connected to multi-level inverters 7', a first multi-level inverter 7a' connected to a first stator segment 3a' and a second multi-level inverter 7b' connected to a second stator segment 3b'. A drive unit 4' of the stator 3' comprises at least two multi-level inverters 7', including a first multi-level inverter 7a' and a second multi-level inverter 7b'. The first and second multi-level inverters are identical, each being connected to a separate stator segment 3a', 3b' respectively. Each of the multi-level inverters 7a', 7b' may be connected to a plurality of stator segments (not shown) via switches such that one multi-level inverter 7' may be used to successively drive successive stator segments as a function of the advancement of the mobile motor element 2' of the linear electric motor as it progresses along the long stator of the linear electric motor.

In the conventional system illustrated in FIG. 1, the stator segments are arranged successively and are essentially identical and oriented all in the same manner.

Referring to FIG. 2, the output currents of the first and second inverters for each of the three phases of the conventional stator are illustrated. As the motor mobile element is driven along the stator segment, the reactive power causes an oscillation in the voltage across each of the linking capacitors C1' and C2'. Although the total DC voltage is constant, the voltage oscillations across the DC-link capacitors C1', C2' deteriorates the quality of the output current and thus the thrust, and results in a less effective utilization of the DC circuit voltage range.

Figure 3:
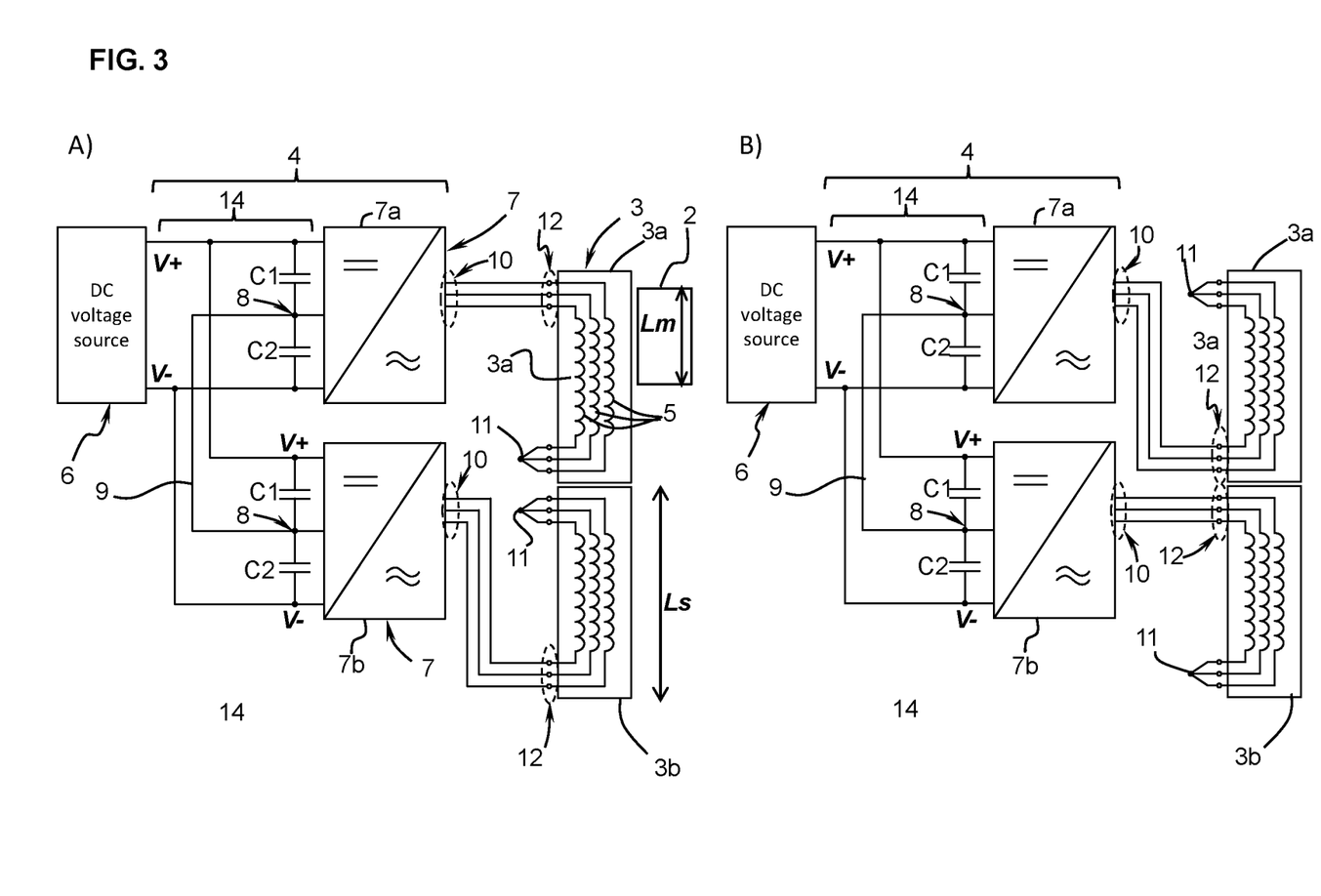
FIGS. 3a and 3b each show a schema of a circuit of a section of a long stator, showing two consecutive stator segments connected each to one of a pair of three-level inverter drives, according to embodiments of the invention.
Figure 4:
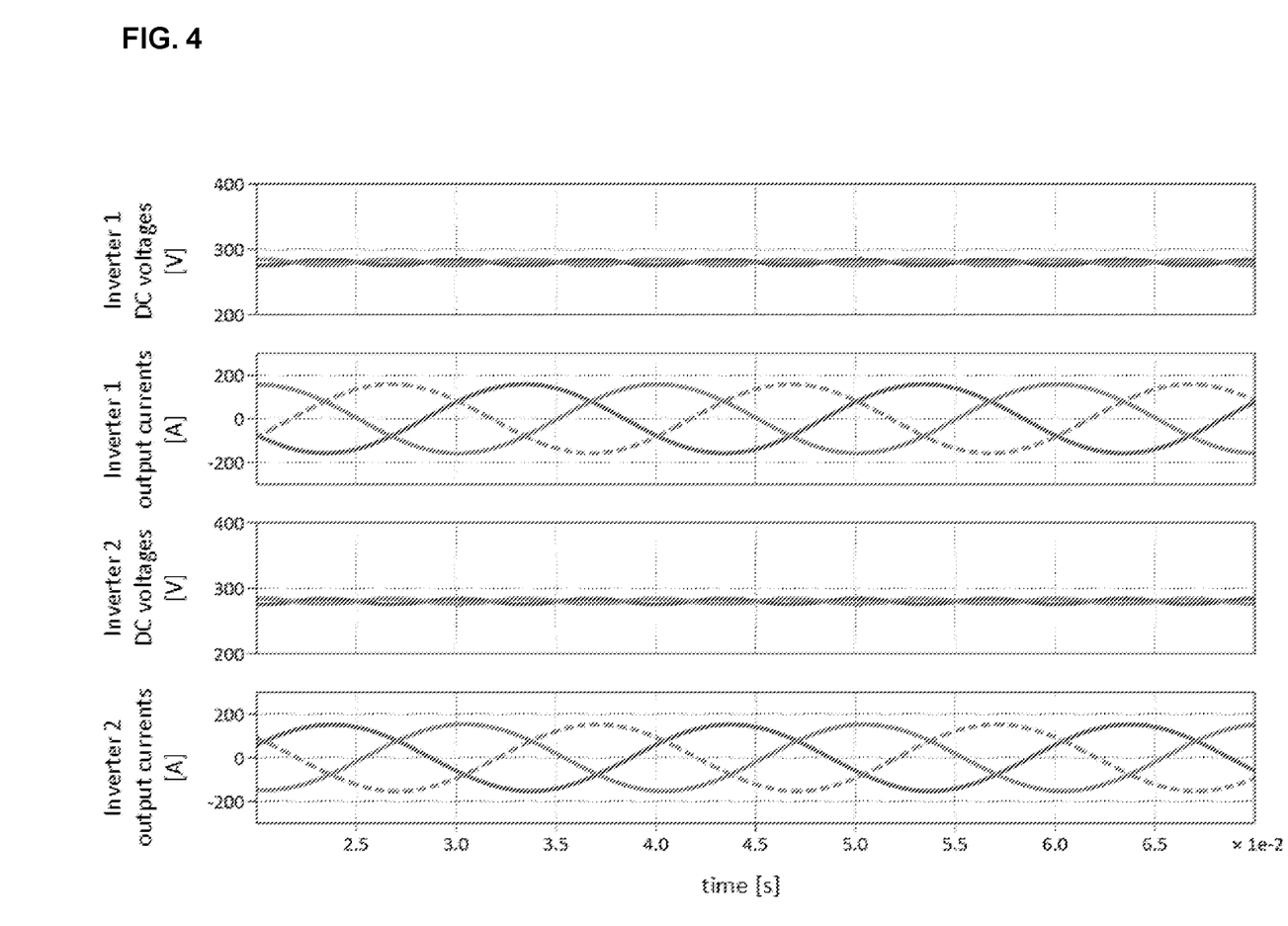
FIG. 4 show plots, over time, of output currents and fluctuations in the voltage across the link capacitors in the DC circuit portion of the two inverters of the drives of FIGS. 3a and 3b according to embodiments of the invention.

Referring now to FIGS. 3 and 4, embodiments of the invention are illustrated that overcome the above-mentioned drawback of conventional linear drive systems. The linear electric motor 1 comprises a stator 3 having a plurality of stator segments 3a, 3b connected to multi-level inverters 7, a first multi-level inverter 7a connected to a first stator segment 3a and a second multi-level inverter 7b connected to a second stator segment 3b.

A drive unit 4 of the stator 3 comprises at least two multi-level inverters 7, including a first multi-level inverter 7a and a second multi-level inverter 7b. The first and second multi-level inverters are each connected to a separate stator segment 3a, 3b respectively. Each of the multi-level inverters 7a, 7b are connected to a plurality of stator segments via switches such that the first multi-level inverter 7a is used to drive successive odd number stator segments and the second multi-level inverter 7b is used to drive successive even number stator segments, as a function of the advancement of the mobile motor element 2 of the linear electric motor as it progresses along the stator.

For instance, the mobile motor element may comprise permanent magnets or electromagnets mounted on a locomotive of a train or element of a crane, a robot, or any other machinery having a linear long stator and a relatively short mobile motor element driven therealong.

According to the invention, the mid-points 8 between the DC link capacitors C1 and C2 of the first and second multi-level inverters 7a, 7b are interconnected by a mid-point bridge connection 9. The positive and negative voltage supply lines V+, V− of the first and second multi-level inverters 7a, 7b are also connected together.

Figure 5:
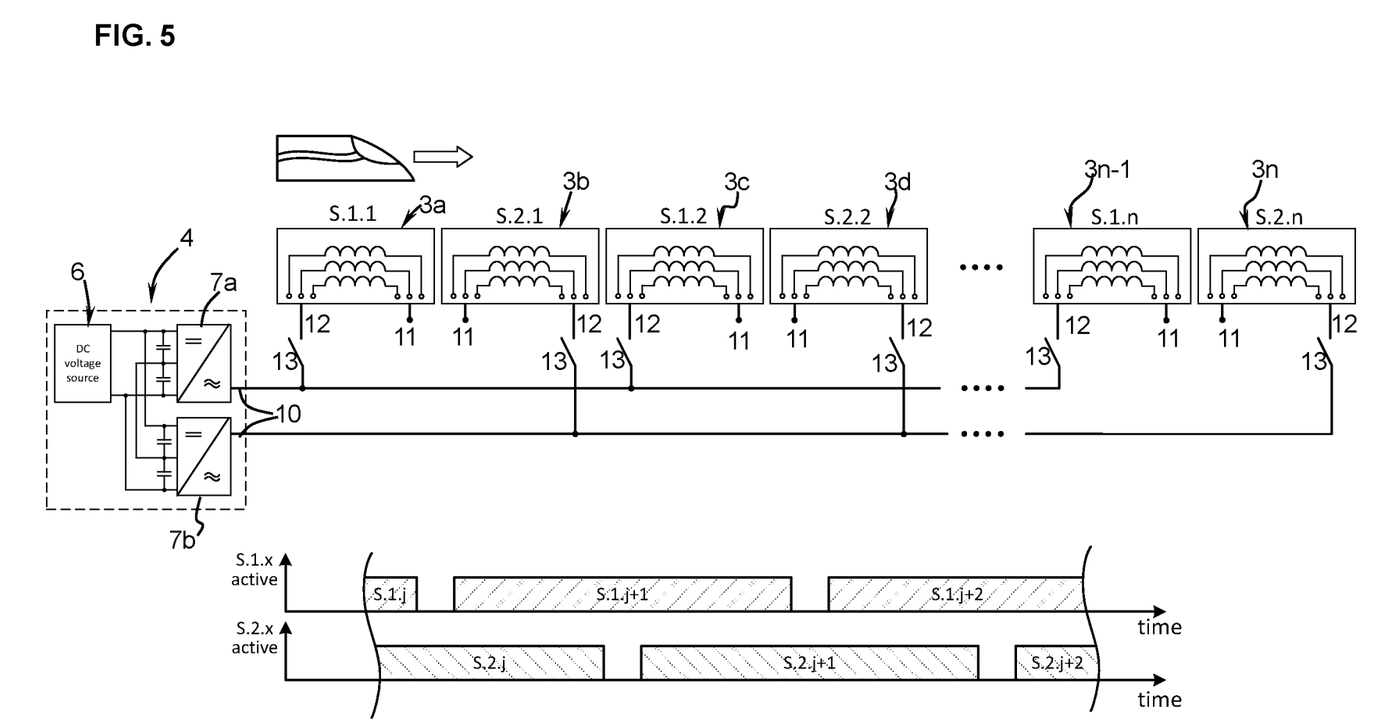
FIG. 5 shows a schema of a circuit of a section of a long stator, showing a plurality of consecutive stator segments connected each to a three-level inverter drive of a pair similar to the configuration of FIGS. 3a and 3b.

The multiphase output 10 of the inverters are connected to windings or coils 5 in each stator segment 3a, 3b. The other end of the coils 5 of the multiphase drive, in this example a three-phase drive, comprises three coils which are connected at their terminal ends in a star connection per se well known in the art. However, in the invention, the stator windings 5 are connected in an alternating manner such that the connections of windings 3 of adjacent stator segments 3 are arranged to form an opposing configuration as best seen in FIGS. 3a and 3b. Thus, successive stator segments 3a, 3b supplied from two different inverters 7a, 7b are arranged next to each other in mirror image symmetry, either with the sides with input terminals 12 (also named drive connection end 12 herein) next to each other as shown in FIG. 3a or with the star connection ends next to each other as shown in FIG. 3b. These opposing arrangements are found then in a long stator with a plurality of segments as best seen in FIG. 5. The opposing arrangement leads to generation of reactive power with voltages of opposite signs (opposite directions) in adjacent stator segments 3a, 3b as the mobile motor element 9 passes across from one stator 3a successively to the next adjacent stator 3b, such that the voltage oscillations cancel each other out, at least partially, thus reducing power loss and increasing efficiency.

The circuit configuration of embodiments of the invention has the effect of significantly reducing the voltage variations in the DC circuit portion of the drive unit 4 across the link capacitors C1, C2 as illustrated in FIG. 4, leading to greater efficiency and power than a conventional system.

Figure 5B:
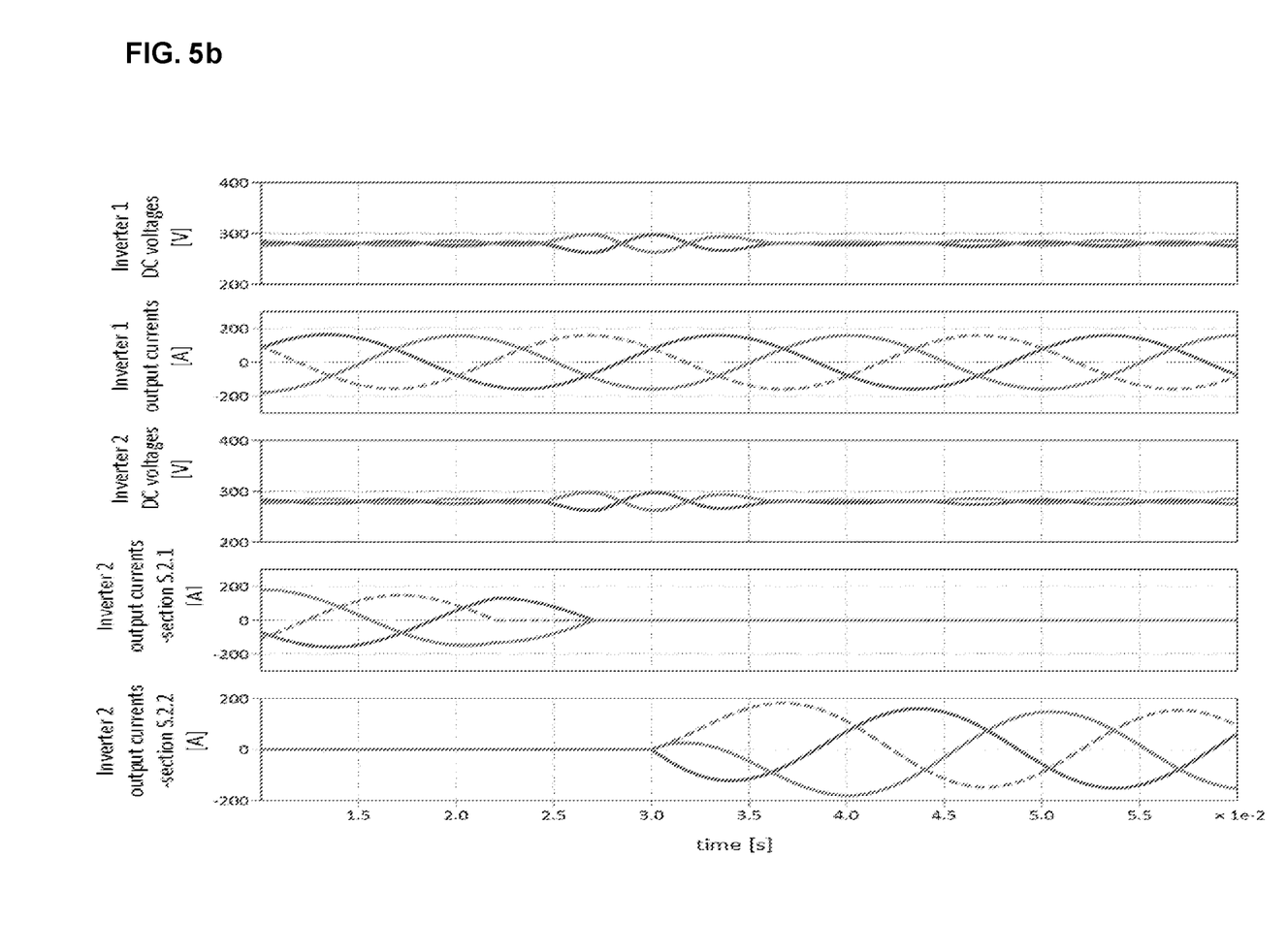
FIG. 5b show plots, over time, of output currents and fluctuations in the voltage across the link capacitors in the DC circuit portion of the inverters of the drives of FIG. 5.

FIG. 4 illustrates an ideal situation, however when the mobile motor element passes from one stator segment to a successive stator segment as shown in FIG. 5, the passage of the mobile motor element from one segment to the next segment, which are switched successively in an overlapping fashion as best seen in FIG. 5, leads to some voltage oscillation across the link capacitors as illustrated in FIG. 5b, however of significantly smaller amplitude than in the conventional configuration.

Figure 6:
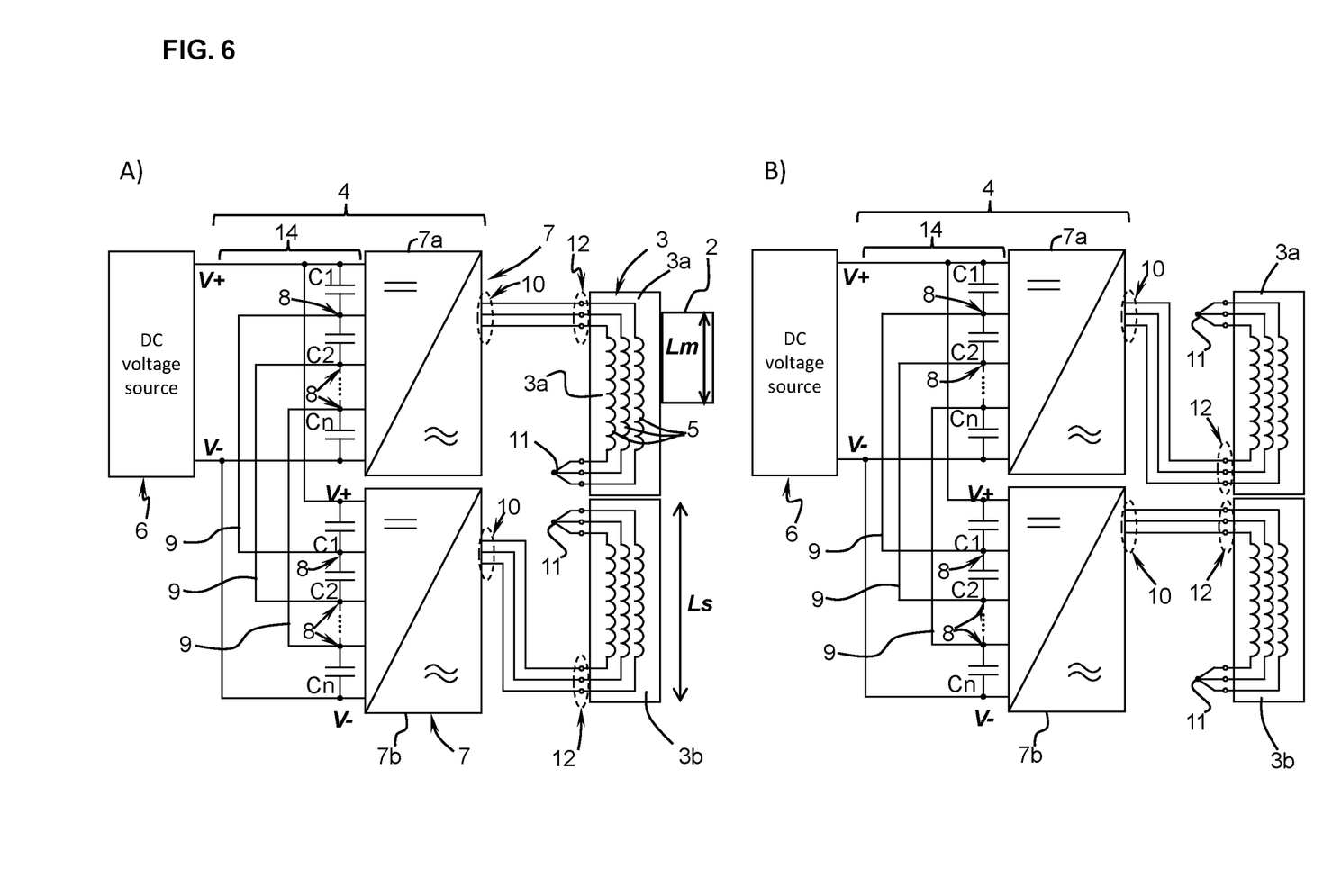
Figure 7:
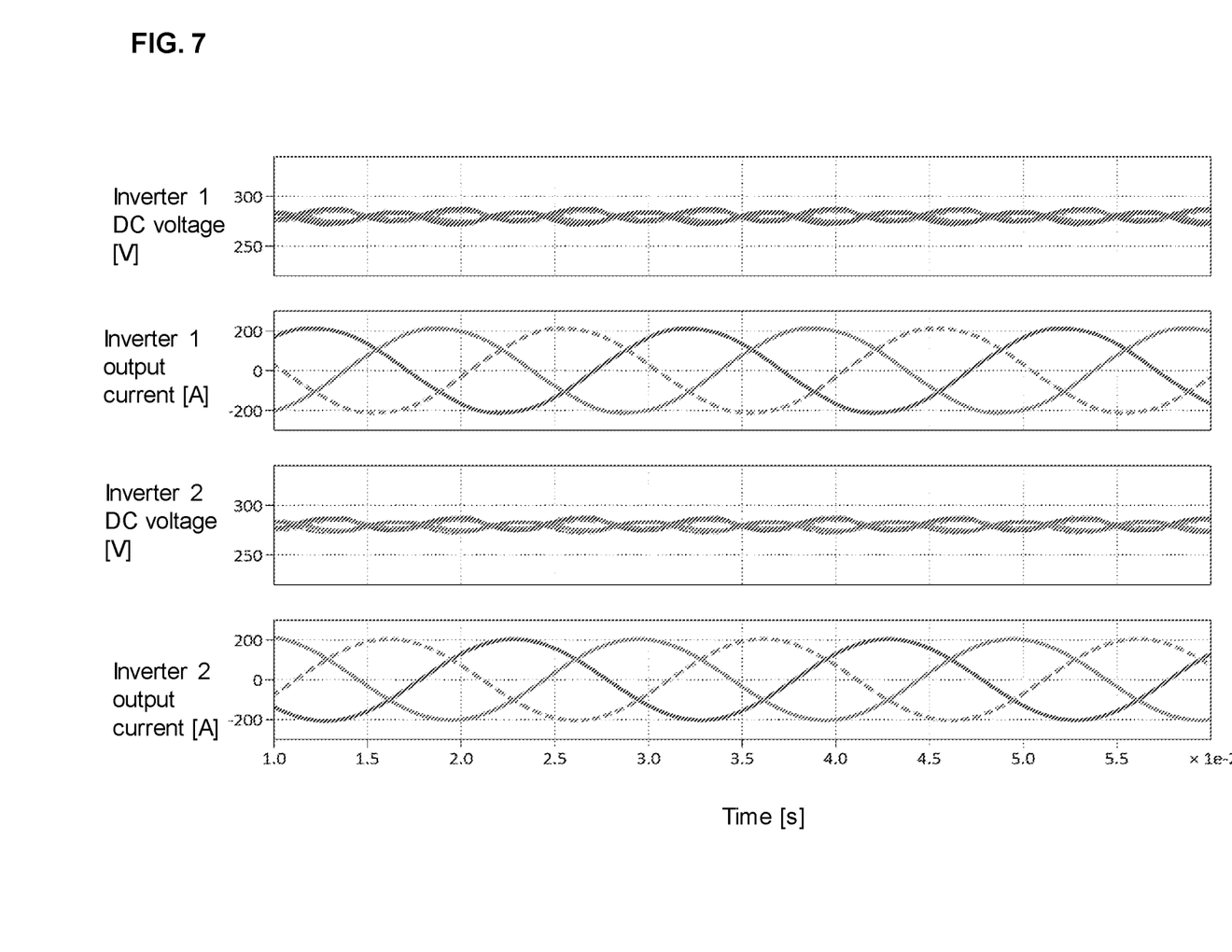
FIG. 7 show plots, over time, of output currents and fluctuations in the voltage across the link capacitors in the DC circuit portion of the inverters of the drives of FIGS. 6a and 6b according to embodiments of the invention.

A three-level inverter constitutes the preferred embodiment in view of the greater simplicity of the drive circuit, however the invention may be employed according to similar principles on five-level or higher level inverters as illustrated in FIGS. 6 and 7. In a multi-level inverter with five or more levels as illustrated in FIGS. 6a and 6b, the mid-points 8 between corresponding link capacitors C1, C2, C3, . . . Cn are interconnected with bridging connections 9 according to the same principle as the three-level inverter described above and the voltage supply V+, V− lines are also interconnected.

Figure 8:
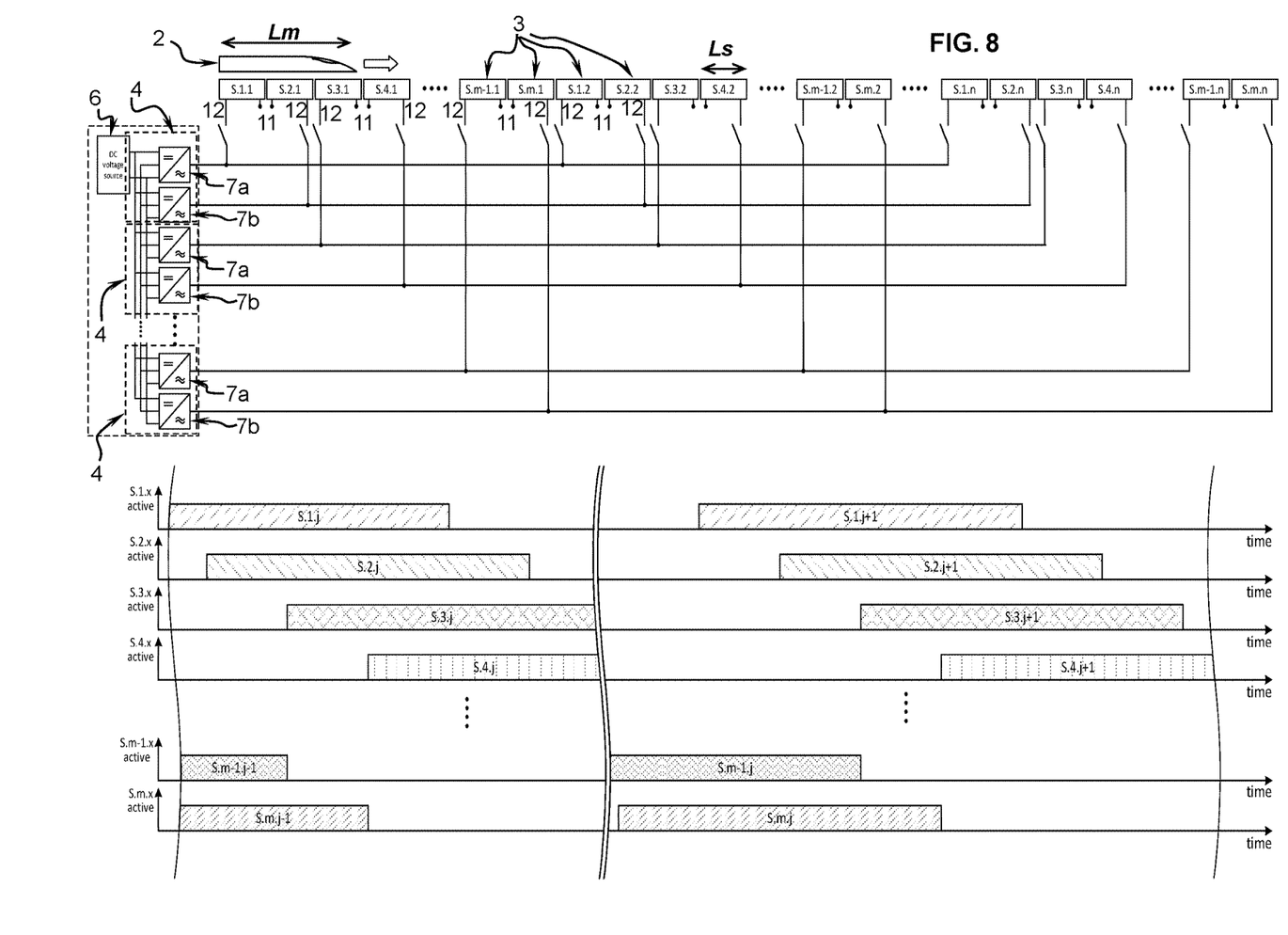
FIG. 8 shows a schema of a circuit of a section of a long stator, showing a plurality of consecutive stator segments, and a plurality n of pairs of multi-level inverter drives, each stator segment connected to one multi-level inverter drive of one of the plurality of pairs, in conjunction with a plot showing the switching sequence of successive stator segments, whereby there are a plurality of multi-level inverter drives according to an embodiment of the invention.

FIG. 8 illustrates an example of a switching sequence from one segment to the next in a system using a plurality n of pairs of multi-level inverters. In the present example the inverters are three-level inverters but could also be higher level inverters, for instance the multi-level inverters described in relation to FIG. 6. In FIG. 8 switching signals are presented for the case where the mobile element length Lm is greater than the stator segment length Ls and the number of pairs of multi-level inverters is greater than the number of active stator segments. This configuration gives more possibilities to compensate voltage unbalance in the DC input sections of the active multi-level inverters by using non-active multi-level inverters as an external balancer. For example, for a drive system comprising three pairs of multi-level inverters (i.e. six multi-level inverters) and a mobile element length Lm between two and three stator segment lengths Ls (2Ls<Lm<3Ls), two pairs of multi-level inverters (i.e. four multi-level inverters) may be active in terms of thrust generation and one pair of multi-level inverters (i.e. two multi-level inverters) may be used to compensate voltage oscillations. This is particularly advantageous because the inverters not participating in thrust generation are not affected by output current quality and may thus be controlled to compensate voltage unbalance more effectively.

LIST OF REFERENCES

Linear electrical motor 1
Mobile element 2
  Permanent magnets
Stator 3
  Drive system
  Drive unit 4
    DC Voltage source 6
    DC input section 14
    Multilevel inverters 7
      First Multilevel inverter 7a
      Second Multilevel inverter 7b
      Link capacitors C1, C2
      Mid-point (Neutral Point NP for a 3 level inverter) 8
      Mid-point bridge connection (NP bridge for 3 level inverter) 9
      Multiphase output 10
      Switches 13
  Stator segment 3a, 3b, . . . 3n
    Coils 5
      Star connection end 11
      Drive circuit connection end 12
    Armature
  Stator segment length Ls
  Mobile element length Lm

The invention claimed is:

1. A linear electric motor comprising a stator comprising a plurality of stator segments and a drive system comprising at least one pair of drive units, a first drive unit of said pair connected to a first stator segment and a second drive unit of said pair connected to a second stator segment adjacent the first stator segment, the drive units connected to a DC voltage source, each drive unit comprising a DC input circuit section and a multilevel inverter connected to the DC voltage source via the DC input circuit section, the multilevel inverter comprising a multiphase output connected to a drive circuit connection end of coils of the corresponding stator segment, the DC input circuit section of each drive unit comprising at least two link capacitors (C1, C2) connected in series between a positive and a negative voltage supply line (V+, V−) and having a mid-point therebetween, wherein the mid-point of the first multilevel inverter is connected via a bridge connection to the mid-point of the second multilevel inverter such that the mid-points of the first and second multilevel inverters are at a common electric potential, and in that the drive circuit connection end of the coils connected to the first multi-level inverter is arranged adjacent the drive circuit connection end of the coils connected to the second multi-level inverter, or a star connection end of the coils of the first stator segment is positioned adjacent a star connection end of the second stator segment.

2. The linear electric motor according to claim 1, wherein each stator segment comprises a three-phase coil arrangement.

3. The linear electric motor according to claim 1, wherein the first drive unit is connected to plurality of successive odd numbered stator segments and the second drive unit is connected to a plurality of even numbered stator segments, the odd numbered and even numbered stator segments interleaving each other, the stator segments being connected to the corresponding drive via switches that are connected and disconnected according to the passage of the mobile motor element from one stator segment across to the next.

4. The linear electric motor according to claim 1, wherein the first and second multi-level inverters are three-level inverters.

5. The linear electric motor according to claim 1, wherein the first and second multi-level inverters are inverters with more than three-levels, for instance with five-levels.

6. The linear electric motor according to claim 1, comprising a plurality (n) of said pair of drive units.

7. The linear electric motor according to claim 6, wherein said plurality (n) of pairs of drive units is three or more.

8. The linear electric motor according to claim 6, wherein the drive system is configured to control at least one multi-level inverter as an external balancer to compensate voltage oscillations in the DC input sections of at least one pair of active multi-level inverters generating thrust.

9. The linear electric motor according to claim 1, wherein a length Ls of each stator segment is greater than a length Lm of a mobile motor element of the linear electrical motor.

10. The linear electric motor according to claim 1, wherein a length Ls of each stator segment is less than a length Lm of a mobile motor element of the linear electrical motor.

11. The linear electric motor according to claim 10, wherein the length Lm of the mobile motor element of the linear electrical motor is greater that two times the length Ls of each stator segment.

* * * * *